(12) United States Patent
Howard et al.

(10) Patent No.: US 11,205,149 B2
(45) Date of Patent: Dec. 21, 2021

(54) SYSTEMS AND METHODS FOR REMOTE EVALUATION OF CRAFT SKILLS

(71) Applicant: SOCIETY OF CABLE TELECOMMUNICATIONS ENGINEERS, INC., Exton, PA (US)

(72) Inventors: Daniel Harvey Howard, Atlanta, GA (US); Thomas Martin Davidson, Highlands Ranch, CO (US); Dean Alan Stoneback, Harleysville, PA (US); Steven Richard Harris, Haddonfield, NJ (US); Pamela Ann Nobles, Chester Springs, PA (US); Christopher Dale Bastian, Glenmoore, PA (US)

(73) Assignee: Society of Cable Telecommunications Engineers, Inc., Exton, PA (US)

( * ) Notice: Subject to any disclaimer, the term of this patent is extended or adjusted under 35 U.S.C. 154(b) by 0 days.

(21) Appl. No.: 16/888,103

(22) Filed: May 29, 2020

(65) Prior Publication Data
US 2020/0401980 A1 Dec. 24, 2020

Related U.S. Application Data

(63) Continuation-in-part of application No. 15/657,126, filed on Jul. 22, 2017, now abandoned.

(60) Provisional application No. 62/369,052, filed on Jul. 30, 2016.

(51) Int. Cl.
| | | |
|---|---|---|
| G06Q 10/06 | (2012.01) | |
| G06Q 10/10 | (2012.01) | |
| H04B 10/079 | (2013.01) | |
| G06Q 10/00 | (2012.01) | |
| G06Q 50/20 | (2012.01) | |
| G09B 19/00 | (2006.01) | |

(52) U.S. Cl.
CPC ....... *G06Q 10/06398* (2013.01); *G06Q 10/10* (2013.01); *G06Q 10/20* (2013.01); *H04B 10/07955* (2013.01); *G06Q 50/2057* (2013.01); *G09B 19/00* (2013.01)

(58) Field of Classification Search
CPC .. G06Q 10/06398; G06Q 10/10; G06Q 10/20; G06Q 50/2057; H04B 10/07955; G09B 19/00
USPC ........................................................ 705/7.42
See application file for complete search history.

(56) References Cited

U.S. PATENT DOCUMENTS

| | | | | |
|---|---|---|---|---|
| 5,521,958 | A * | 5/1996 | Selig .................. | H04M 1/24 379/21 |
| 5,924,069 | A * | 7/1999 | Kowalkowski ........ | G10L 15/26 704/275 |
| 2005/0111628 | A1* | 5/2005 | Beamon .............. | H04M 3/2254 379/27.01 |

(Continued)

OTHER PUBLICATIONS

Proactive network maintenance: Engineering-wise. Davidson, Marty. CED Advantage Business Media. (Dec. 2, 2014).*

(Continued)

*Primary Examiner* — Timothy Padot
(74) *Attorney, Agent, or Firm* — Volpe Koenig

(57) ABSTRACT

System, methods, and devices for measuring the performance of a component of a communications network recently installed by a technician using proactive network maintenance parameters, and further assessing the installation performed by the technician.

15 Claims, 8 Drawing Sheets

Stand-Alone Setup

(56) References Cited

U.S. PATENT DOCUMENTS

2008/0249825 A1* 10/2008 Kunjur ............... G06Q 10/0637
                                                      705/7.36
2010/0138474 A1*  6/2010 Harkins ................ G06Q 10/06
                                                      709/203
2015/0095960 A1*  4/2015 Hurst .................... H04N 17/00
                                                      725/107

OTHER PUBLICATIONS

Advanced Technology Tools Highlight CableLabs(R) Demonstration at SCTE Cable-Tec Expo(R) 2011. Business Wire [New York] Nov. 9, 2011.*

Sasisekharan, R. et al. Proactive network maintenance using machine learning. IEEE in Houston. LOBECOM '93. IEEE Global, Telecommunications Conference, including a Communications Theory Mini-Conference. Technical Program Conference Record, Cat. No. 93CH3250-8): 217-22 vol. 1;4 vol. (xxxix+2021+xvi+148). IEEE. (1993) *Cited in parent application.

* cited by examiner

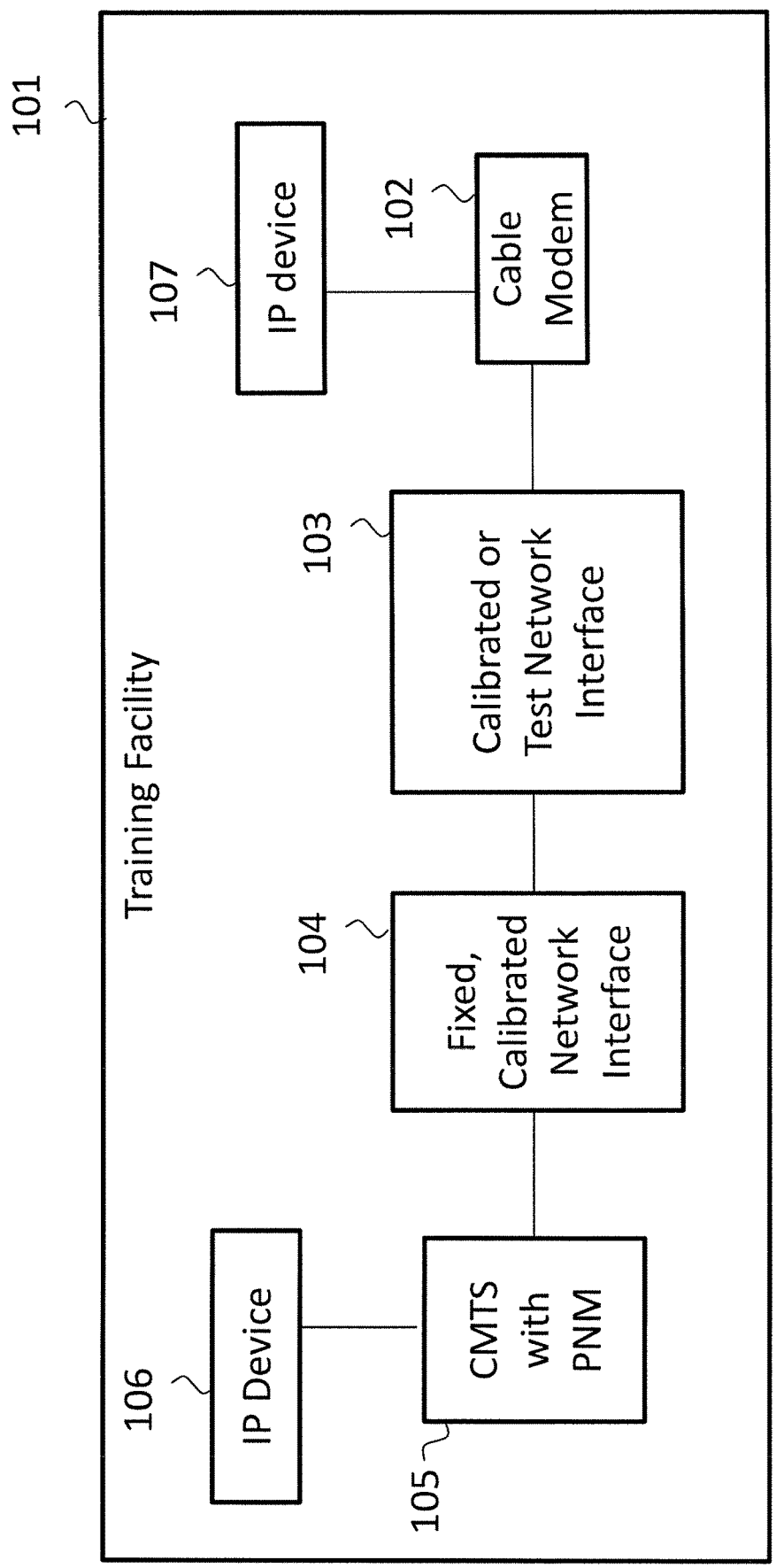
Fig 1. Stand-Alone Setup

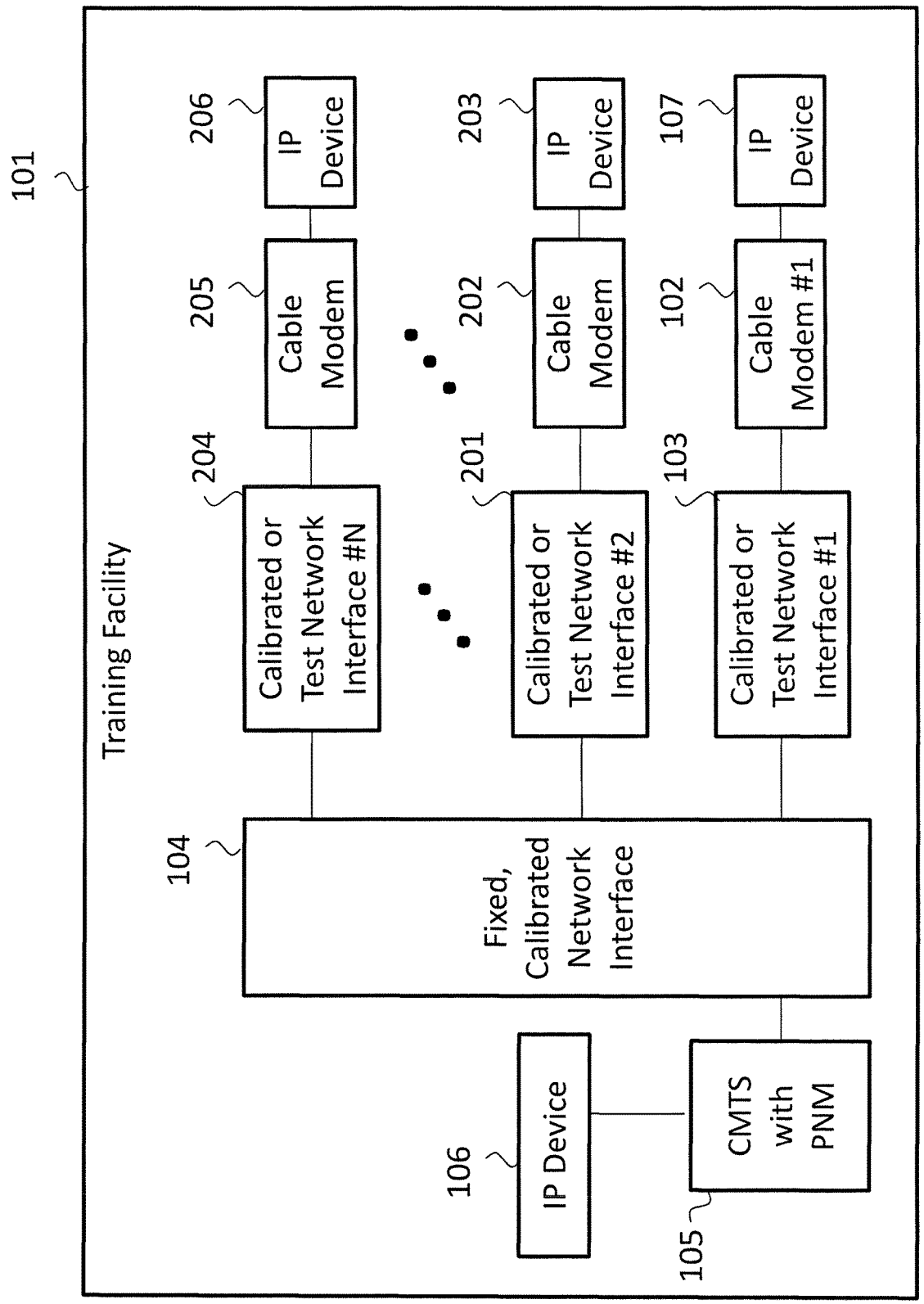
Fig 2. Multi-Station Setup

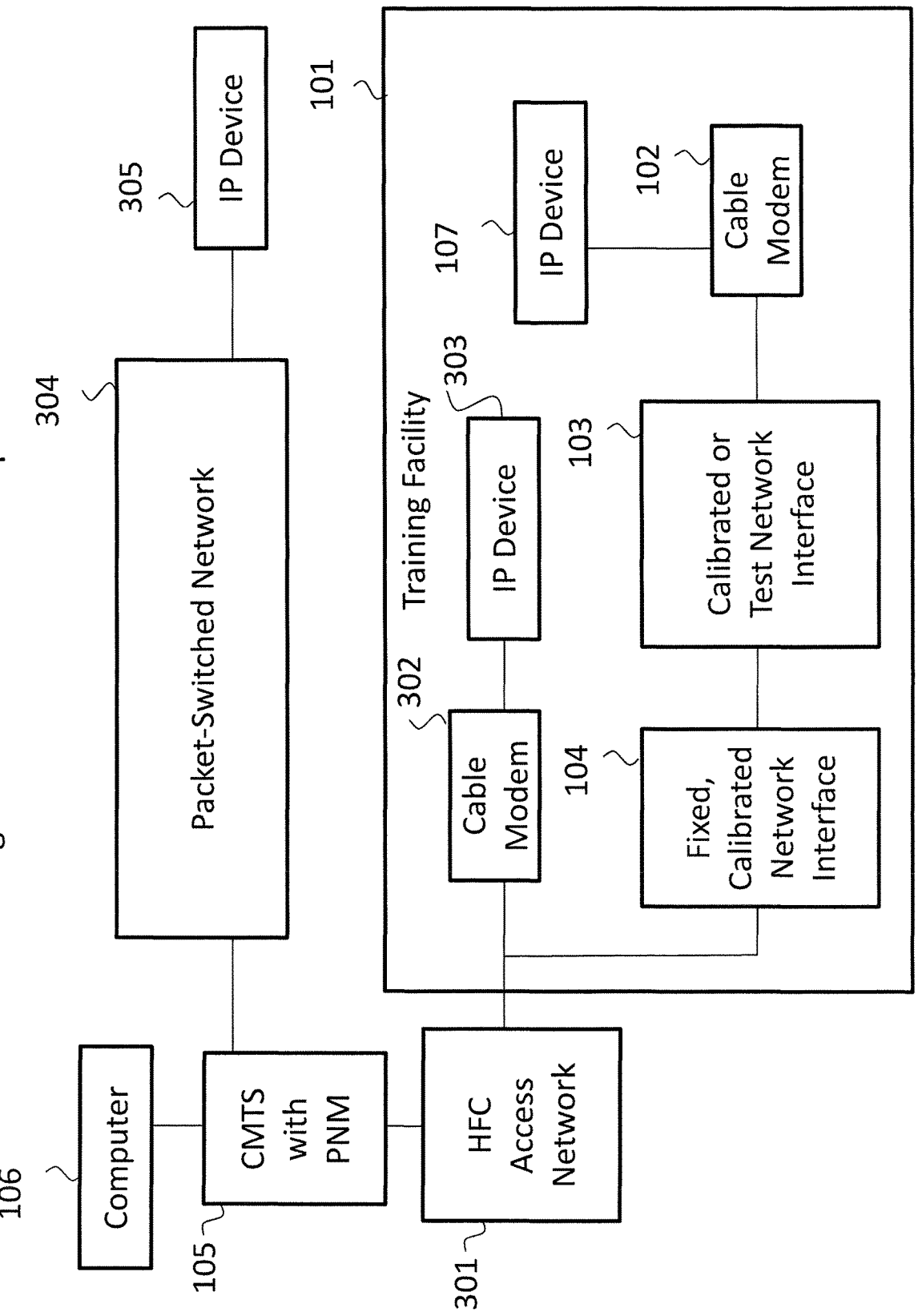
Fig 3. Remote CMTS Setup

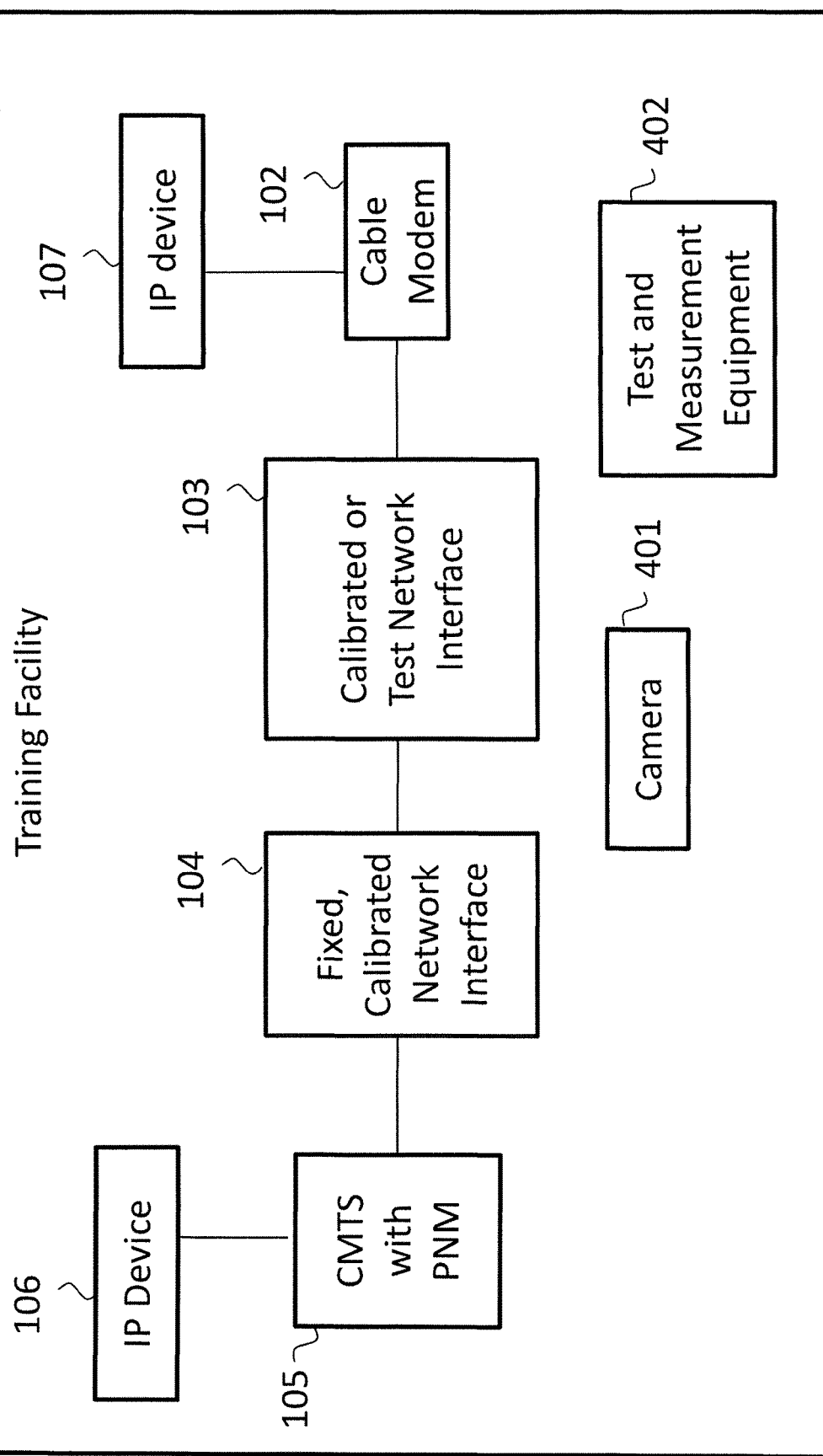
Fig 4. Stand-Alone Setup with Additional Sensors

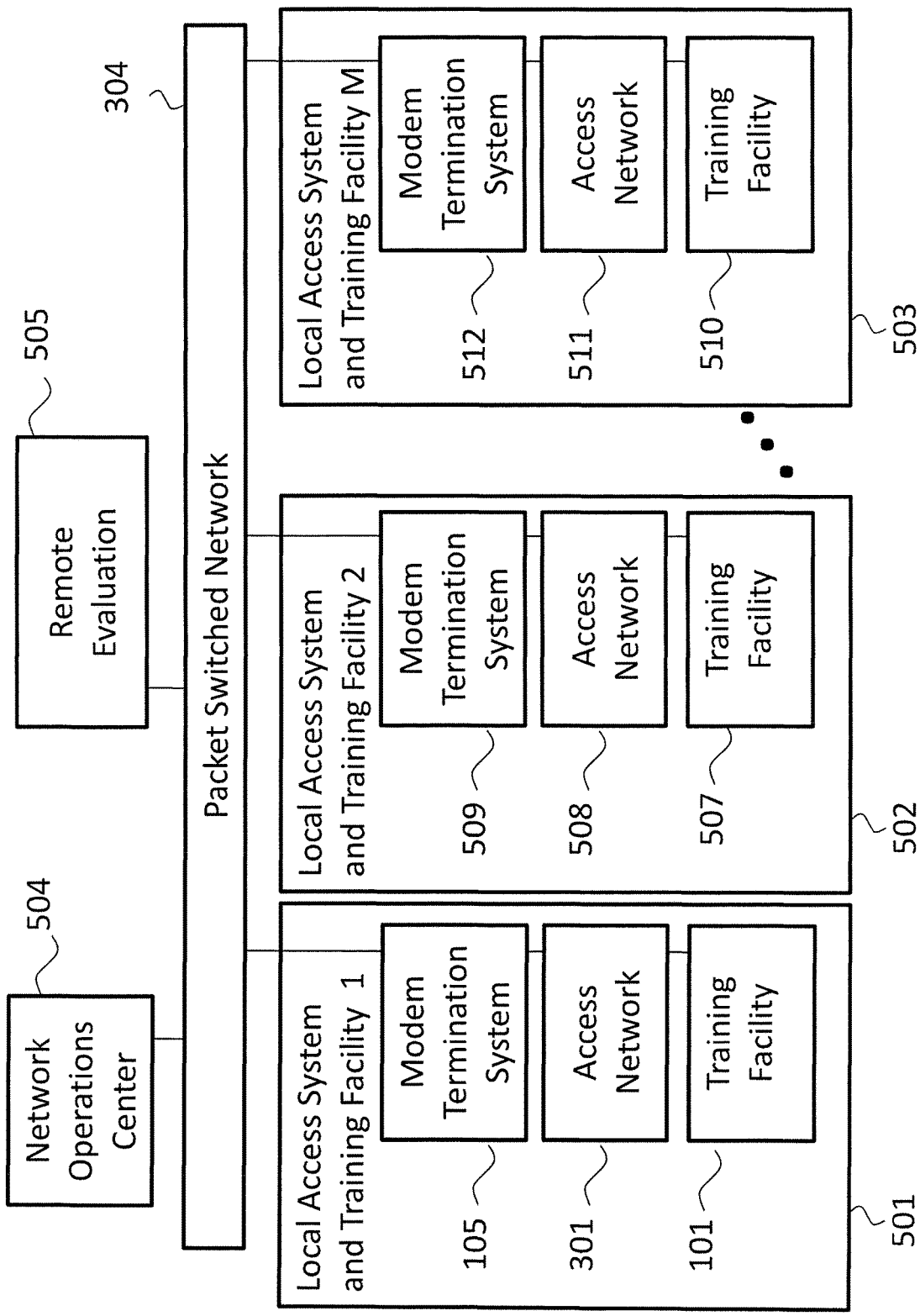
Fig 5. Remote Evaluation Architecture Example

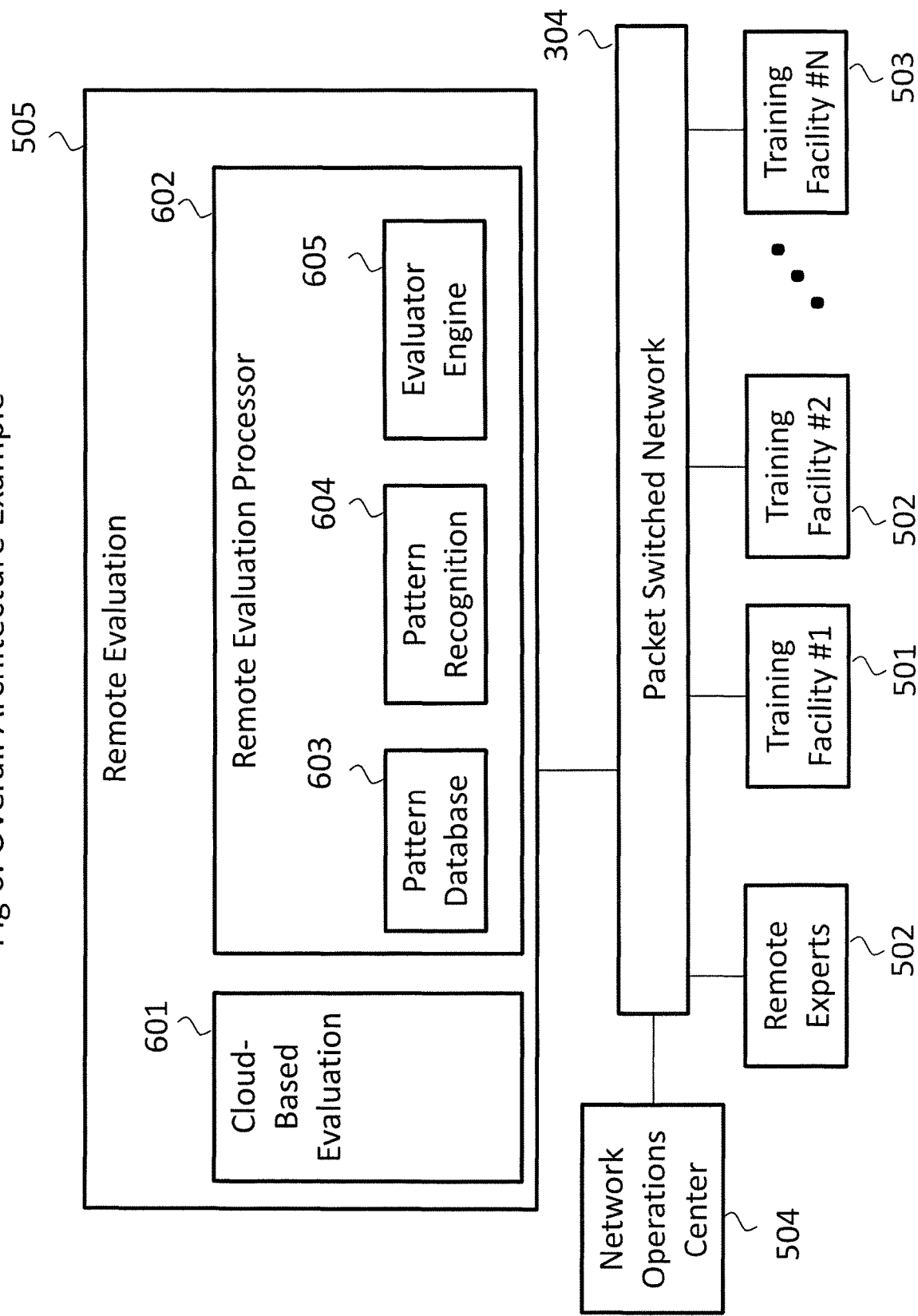
Fig 6. Overall Architecture Example

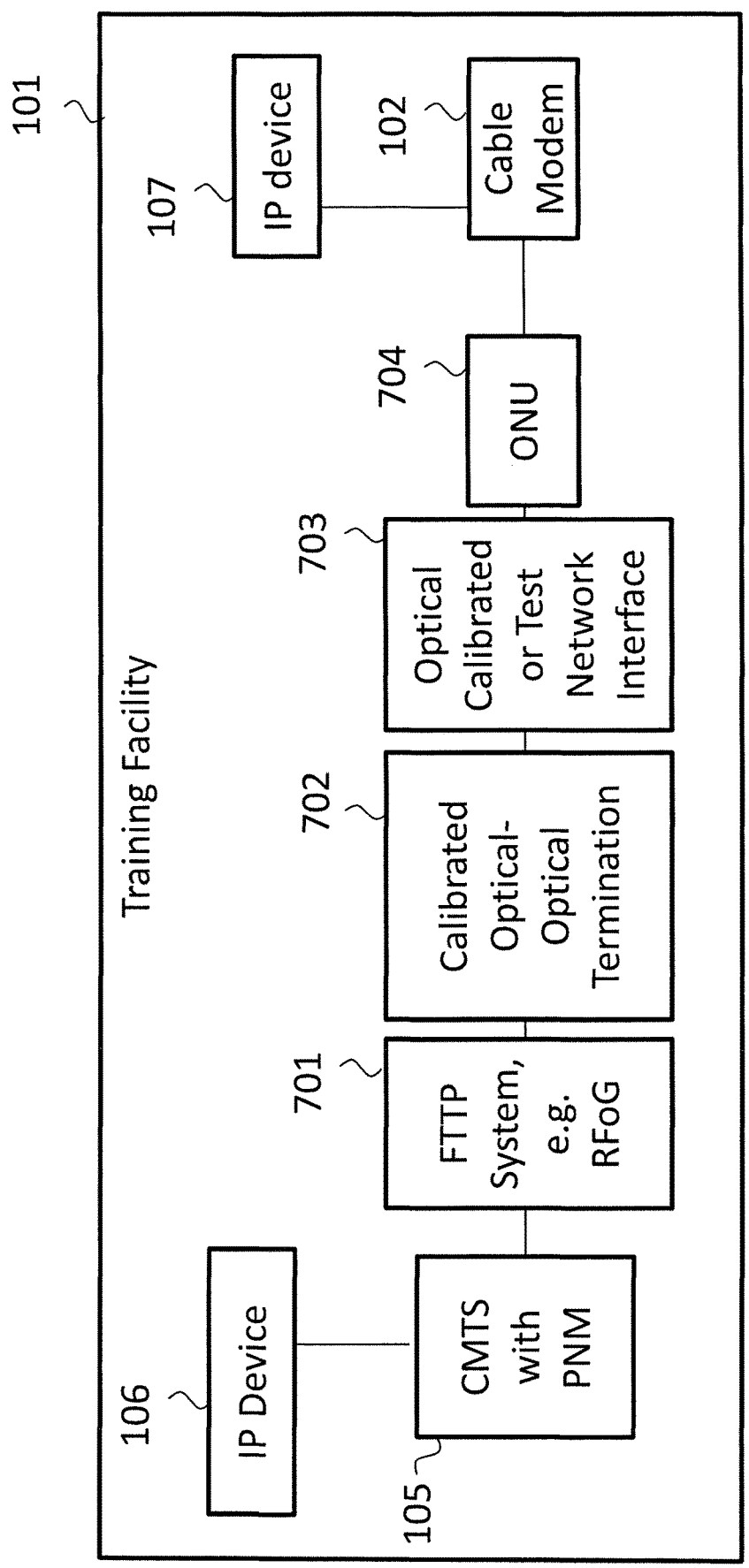
Fig 7. Optical Stand-Alone Setup

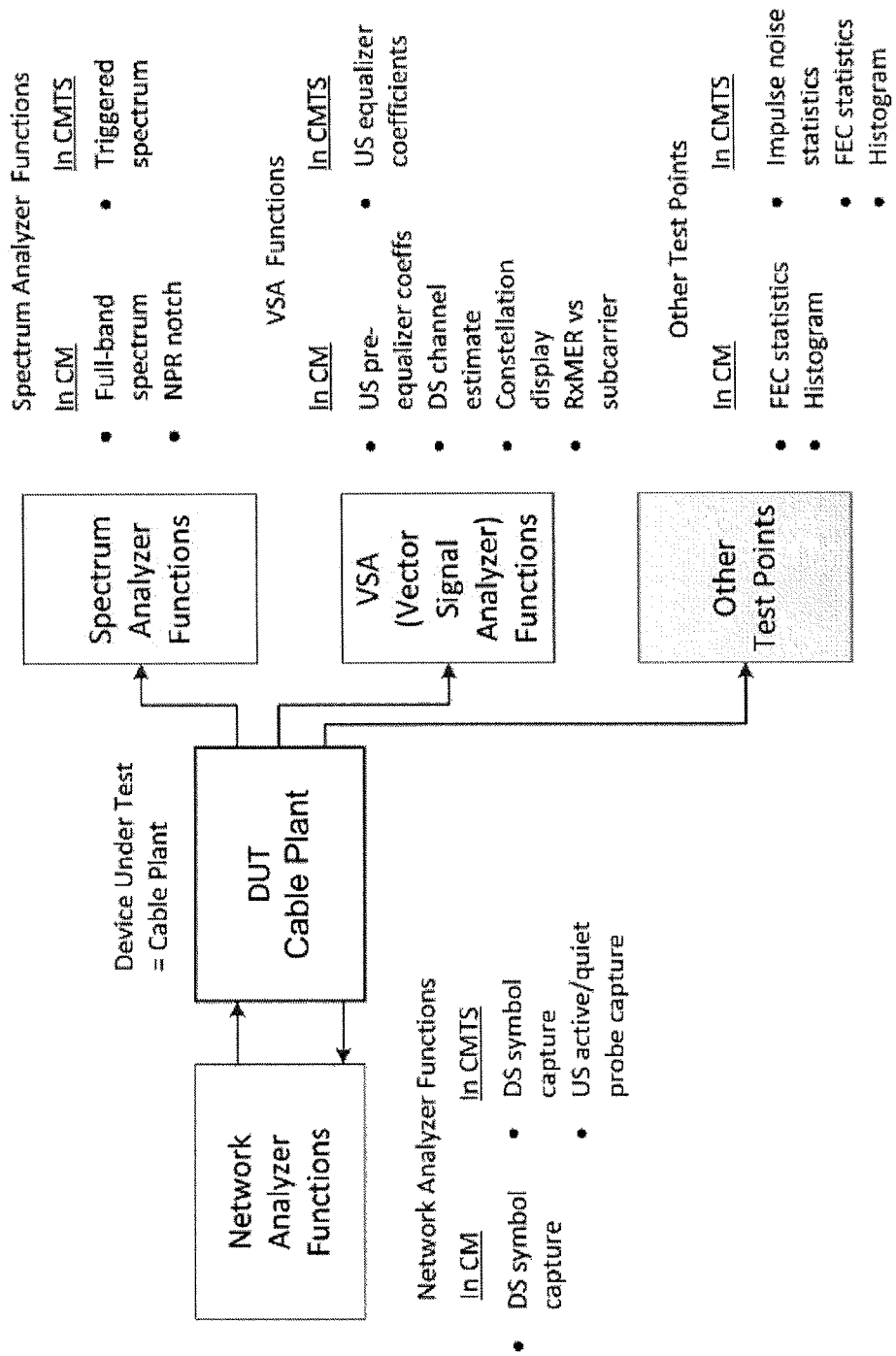
Fig 8. Physical Layer Specification

SYSTEMS AND METHODS FOR REMOTE EVALUATION OF CRAFT SKILLS

FIELD OF INVENTION

The present invention relates to proactive network maintenance technologies.

BACKGROUND

Craft skills in the telecommunications workforce are critical to the proper operation of telecommunications networks. The performance of such networks often depend heavily on how well connectors, patches, devices, and other physical entities are attached to the wireline infrastructure, and also on how provisioning and other modifications to, and maintenance of the actual wireline and wireless infrastructure are performed by technicians, subscribers, or even robotic devices.

Evaluation of craft skills, especially during training of new technicians, has heretofore been a manual exercise, with instructors or others experienced in the craft visually evaluating the craft of a student to determine if the student has performed the task properly and in a manner that optimizes network performance. Instructors must visually observe the connectors or generally the craft implemented by a student and look for signs of poor workmanship. In some cases, the instructor is able to test the craft of the student using expensive test equipment that evaluates the integrity of the craft handiwork. However many instruction facilities lack this equipment due to cost, and community colleges and other adult education facilities likewise often lack such equipment for comprehensively evaluating the integrity of craft handiwork.

There is thus a need for remote evaluation for all of the above cases with a low cost solution, and also in conjunction with distributed training centers and online, on-demand training and certification evaluation programs and facilities. Further, automated remote evaluation of craft skills would also permit evaluation of consumer craft when installing their own home network wiring and systems.

What makes this possible is a new technology for proactive network maintenance (PNM) in cable networks which allows automated detection of plant impairment such as breaks, short circuits, or any impedance mismatch which causes a variation in the equalization response of the network. PNM allows remote personnel and equipment to evaluate the integrity of the wireline infrastructure in cable networks, and to detect any changes in that network when impairments happen, or when new wires are installed in the network.

In none of the prior art for craft evaluation, especially during training of new technicians, does the approach cover the use of proactive network maintenance technology for remote evaluation of telecommunications craft handiwork, nor the use of video or photography or any combination thereof and an automatic pattern recognition system which is trained by proactive network maintenance technology based on previous patterns that have been catalogued, or the use of cloud-based or crowd-sourced evaluation of remote craft using video, photography, including any of the above, along with proactive network maintenance technology or other network operations procedures, policies, and technologies, to accomplish the remote evaluation of craft skills.

PNM as defined by CableLabs is a network management technique for diagnosing physical layer network issues. PNM features identify performance issues by obtaining data from the following:
Cable Modem (CM)
Cable Modem Termination System (CMTS)
Both the CM and CMTS collaboratively
Examples of these features include:
1) Spectrum analyzer functions—in the CM, full-band spectrum, NPR notching and in the CMTS, triggered spectrum;
2) Vector signal analyzer functions—in the CM, upstream pre-equalization coefficients, DS channel estimate, constellation display, and received MER vs. OFDM subcarriers and in the CMTS, US equalizer coefficients;
3) Network analyzer functions—in the CM, DS symbol capture and in the CMTS, DS symbol capture and US active/quiet probe capture; and
4) Other test points—in the CM, FEC statistics and histograms (very useful for non-linear impairments like laser clipping) and in the CMTS, impulse noise statistics, FEC statistics and histograms.

FIG. 8 diagrammatically shows such features and test points in CM and CMTS supporting PNM.

SUMMARY

System, methods, and devices for measuring the performance of a component of a communications network recently installed by a technician using proactive network maintenance parameters, and further assessing the installation performed by the technician.

BRIEF DESCRIPTION OF THE DRAWING(S)

The present invention will be described with reference to the accompanying figures, where like numerals illustrate like elements.

FIG. 1 shows a system having a PNM for automatic, remote or both automatic and remote evaluation of radio frequency (RF) craft skills.

FIG. 2 shows a multi-station setup version of the stand-alone setup in FIG. 1.

FIG. 3 shows an embodiment using a remote CMTS and minimal equipment in a training facility.

FIG. 4 shows the architecture of a stand-alone setup having additional sensors and stimulators for characterizing the PNM-based craft evaluation.

FIG. 5 shows the architecture of a system that allows a plethora of training facilities to be tied in to a centralized network operations center and a centralized remote evaluation function.

FIG. 6 shows the details of sub-elements within the remote evaluation element.

FIG. 7 shows the architecture of a stand-alone system with PNM-based evaluation of craft skills in non-RF network.

FIG. 8 shows a diagram of test points in CM and CMTS supporting PNM from Physical Layer Specification: CM-SP-PHYv3.1-I10-170111 dated Jan. 11, 2017 from Cable Television Laboratories, Inc.

DETAILED DESCRIPTION OF THE PREFERRED EMBODIMENT(S)

The present invention is directed to systems and methods for remote evaluation of craft skills using proactive network maintenance (PNM) technology as implemented in DOCSIS cable modem technology. The concept involves determining how well technicians are performing craft activities such as connectorizing coaxial cables on the drop line, grounding block, or within the home, but also for plant technicians who are connectorizing coaxial hardline in the outside plant. By using PNM technology, it is possible not only to detect flaws in craft skills, but also to catalog patterns of common craft issues during student training in craft skills that can then be used for troubleshooting problems in the actual network. In addition, PNM technology supports the automatic detection and pattern cataloging of the following common network impairments: RF notches, microreflections, roll-off, LTE and radio ingress, adjacency, filters, and resonant parking. Such patterns can be added to existing databases used for automatically detecting craft issues or other plant impairments in actual networks.

PNM-based remote evaluation of craft skills can be used to evaluate the results of craft activities by students as part of training, as part of remote certification of craft skills, whenever new equipment is used or new procedures are established, and finally as periodic quality check-ups for technicians. PNM-based remote evaluation of craft skills can also serve as a mechanism for supervisors and managers to assess the quality of workmanship of individuals and teams during performance evaluations.

In various aspects of the present invention there is provided a system for PNM-based evaluation of radio frequency (RF) craft skills using 1) a stand-alone setup with a single training station, 2) a stand-alone setup with multiple training stations, 3) a remote cable modem termination system (CMTS) setup, in which the local cable operator's CMTS and associated modulators and access network is used rather than a stand-alone system in the training facility, 4) a stand-alone or remote CMTS system that uses additional sensors such as cameras and community antenna television (CATV) RF measurement equipment, and additional simulators such as RF signal generators, noise generators and other signal generators that reproduce typical interference signals that can ingress into the cable network, 5) a larger scale remote evaluation architecture involving multiple training facilities and access networks, a network operations center, and a remote evaluation element, all of which are connected to each other via a packet-switched network, and 6) a remote evaluation element which includes a cloud-based evaluation function or a remote evaluation processor comprising a pattern database, pattern recognition, and an evaluator engine, or any combination of cloud-based evaluation and an evaluation processor.

In another aspect of the present invention, there is provided a system for remoting evaluating optical craft skills using a similar setup, except that an optical fiber to the premises (FTTP) system is embedded within an RF-based remote evaluation system so that optical craft skills can also be evaluated.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

FIG. 1 illustrates the basic setup of a system that uses PNM for automatic or remote or both automatic and remote evaluation of radio frequency (RF) craft skills. A training facility 101 contains all necessary equipment in this case for automatic evaluation of craft skills by using a stand-alone cable modem system in which a cable modem 102 is initially connected through a calibrated and pre-characterized network interface 103, which may be as simple as a piece of coaxial cable that is at least 2 feet long and more typically 20 feet long that has been connectorized at the highest level of craft possible and serves as a reference for PNM-based characterization of the network RF integrity. The ideal length of cable used in block 103 can be determined by those skilled in the art and in using PNM technology, and will depend on the capabilities of the CMTS 105 used in the setup, however a simple approach for determining the optimum length covered by the present invention would be to create several different lengths, testing initial students with these lengths and identifying the lengths that most obviously highlight the results of student flaws in craftsmanship using the PNM technology and the capabilities of the CMTS 105. The resulting library of flaws vs. lengths of connections can also be used to develop a catalog of impairments, as described later in this document, that not only assist instructors in teaching and evaluating students' craft skills, but also network operations center (NOC) personnel in troubleshooting and identifying sources and types of impairments seen in actual networks, and in particular what the appearance of impairments with different lengths of network interface cables 103 is and how they differ from each other.

In the case of the most modern cable modem termination equipment such as the Converged Cable Access Platform (CCAP), a single system contains all of necessary elements to provide a fully capable cable modem signal to the cable modem 102.

This calibrated network 103 is connected either directly to the cable modem termination system (CMTS) 105, or more typically to another fixed, calibrated network 104 that represents a model of the hybrid fiber-coax network in the training facility, which is then connected to the CMTS 105. Finally, IP devices 106 and 107 are connected to the CMTS 105 and cable modem 102 respectively, so that communications can be monitored, the ability of the network to transport data can be verified and baselined, and results can be displayed to instructors and students who are being trained in craft skills. Example IP devices 106 and 107 include, but are not limited to desktop and laptop computers, tablet computers, and smart phones.

After a student performs a basic craft skill such as putting F-connectors on a test piece of coaxial cable drop line that is the same length as the calibrated piece 103, this test cable is then used to replace the calibrated cable in block 103 of FIG. 1, and PNM is used to determine the changes in the network RF integrity that result from the student's cable. Typical PNM measurements include in-channel frequency response, group and phase delay variation, and most generally, the electronic impulse response of the network with the new cable inserted. Using procedures well-known to practitioners of PNM technology, the PNM technology is used to identify any flaws in the student's craft, whether they are located on one or both ends of the cable, and how it impairs the network, e.g. as a short circuit, an open circuit, or merely an impedance mismatch.

This method can be applied to evaluating craft skills for either coaxial drop line, or also coaxial hardline using stinger-type connectorization, which can be even more challenging to learn proper craft skills than drop lines. Additionally, if the PNM technology supports interpolation or DOCSIS 3.1 or both, it is possible to use shorter lengths of coaxial cable for test connections.

The fixed, calibrated network interface 104 can take on several forms in the present invention, some of which include, but are not limited to: 1) a single piece of coaxial cable; 2) a splitter with multiple lengths of cables coming from each output and proper termination on all but the one in use by the student for testing their test network interface 103; or 3) a splitter with one output being a reference, high integrity cable network interface and the other being a network interface with a known, characterized impairment that serves as a reflection for the impairments from the student's test network interface 103 for ease of PNM-based characterization and identification of flaws in craftsmanship.

This method can also be used not just for spot testing of student craft skills, but also for trend analysis, both for a single student, tracking his or her progress from initial craft capabilities to final testing and certification of their craft capabilities, but also for ensembles of students to determine the average, below average, and above average craft capabilities that are possible at this stage of student training. This can then be compared to PNM-based evaluation of craft skills of technicians with years of experience and thus used to set long term targets for craft levels and plan training programs for achieving these longer term levels at the earliest possible time in the students' careers. The same setup can also be used as a periodic quality checkup for existing technicians, to ensure that craft skills are still at required levels for network key performance indicators (KPIs) that are used to grade all technicians. Further, a series of connectors of varying degrees of integrity could be created to teach both students, instructors and NOC personnel the relationship between such flaws and customer experience by testing services on the IP device 107. Correlating known impairments to service impacts as described in the present invention then serve to develop a new or enhanced grading scale for technicians in the field based on their craft work.

Another example use of the present invention is for characterizing the quality of different connectors themselves, and to test different manufacturers' connectors when they have been applied with what is determined from the present invention to be the best possible craft, and see if there are performance advantages of using one connector vs. another. Characterizing multiple workers' example craft on the connectors across different connector types would permit a histogram of PNM-based craft evaluation KPIs such as number and depth of micro-reflections to be compared across types of connectors. Connectors that give the best average and lowest standard deviation in KPIs could offset any additional cost of connectors via the reduced customer issues with such connectors being used. These results could be compared and contrasted with other variables such as the ease of connectorizing them on, immunity to elements (water, humidity, temperature changes) and of course cost.

One method to enhance the performance of the system for rapid and automatic evaluation of student craft skills is to subtract the calibrated network interface 103 initially used from the PNM results using the test network interface in 103 so that only the channel response difference from the student's craft relative to an ideal craft is displayed to instructors or to NOC personnel. Additionally, since there may be some micro-reflections that come from an ideal calibrated network interface 103 over time as it is used in student training, the response of the calibrated network interface 103 should be re-captured and compared to the original reference to ensure a new calibrated reference network interface is not needed.

FIG. 2 shows a multi-station setup version of the stand-alone setup in FIG. 1. The ways the multi-station setup can be achieved include, but are not limited to: 1) a plethora N of independent calibrated network interfaces 201 and 204, and for use by individual students to connect a plethora N of test network interfaces 103, 201 and 204 which are then connected to a plethora N of individual IP devices 107, 203 and 206; or 2) a single bank of calibrated and test network interfaces 103 with each student's test interface (cable) substituting one of the N calibrated interfaces (cables), all of which are then connected to an RF combiner and connected to a single cable modem 102 and IP device 107. In the latter case, careful calibration and choice of cable lengths in both the calibrated and test network is required and can be performed by those skilled in the art. One advantage in particular of multiple cable modems is that the response of each cable modem to PNM queries can be averaged and interpolated for more accurate determination of the PNM-based craft evaluation response for each student.

FIG. 3 shows what may be perhaps the most typical embodiment of the present invention using a remote CMTS 105 and minimal equipment in the training facility 101. This setup allows not only a centralized, remote, or distributed architecture to be used for PNM-based craft evaluation, but also leverages the local cable operator's existing network. In some cases, the equipment required in the training facility 101 may be limited to a cable modem 102, some wiring for constructing the calibrated or test network interface 103, and an IP device 107 for observing the results of PNM-based craft evaluation. The same process as previously described for the calibrated or test network interface 103, cable modem 102 and IP device 107 would be used for PNM-based craft evaluation, the difference is that the fixed calibrated network interface 104 is now optional since an actual HFC access network 301 is used as part of the setup, and in this case the CMTS with PNM 105 is owned and operated by the local cable operator, and thus the use of the present invention would have to be coordinated with the local cable operator, and PNM data from the cable operator's CMTS with PNM 105 would have to be made available to the training facility 101. This may be done either via a separate cable modem 302 in the facility that feeds a separate IP device 303, or could be done through an independent packet switched network 304 such as mobile phone network, DSL network, or fiber to the premises (FTTP) network to an IP device 305 that is either located external to the training facility 101 or within the facility 101. The setup within the training facility 101 may be either the single station or the multi-station, or any combination thereof.

It should be noted that this particular embodiment allows the most realistic PNM data to be generated from the students' test network interface 103, and also minimizes the capital equipment required in the training facility 101, which is why it is predicted to be the most typical embodiment of the present invention.

It should also be noted that this particular embodiment could be implemented not just in a training facility, but in fact in a student's home, community college, local hardware store, and so on, as long as cable modem service was active at that location from the local cable provider. Additionally, the cable provider could do such testing at any of their training facilities, or in their headends or hubs where often canary cable modems are connected to the network.

FIG. 4 shows the architecture of a stand-alone setup that employs additional sensors and simulators for characterizing the PNM-based craft evaluation. Since the current method of craft evaluation prior to the present invention used primarily visual inspection, the setup in FIG. 4 can be used to couple the PNM-based evaluation along with visual inspection, and in particular, take pictures or video of the craft with the camera 401 and attach that media to the catalog containing the PNM-based craft evaluation data in order to 1) improve the accuracy of the PNM-based craft evaluation, 2) develop a detailed catalog of visual clues to specific impairments to enhance the troubleshooting capabilities of technicians in the field, and 3) use machine learning techniques on the collected patterns to predict and recommend future corrective actions.

In addition, FIG. 4 shows test and measurement equipment 402 that can also be used to enhance the accuracy, training, and cataloging of PNM-based craft evaluation. Several examples are described next, but this list in no way limits the number, type or specific use of such equipment when used in conjunction with remote or automated PNM-based craft evaluation.

In the case of the stand-alone setup in FIG. 1, a noise generator might be used to fill the downstream or upstream spectrum with signal so that full band RF spectrum captures can be used to identify microreflections, leaks, or impedance mismatches in the cable network. In this case the noise generator may need the CMTS signal spectrum to be notched out both on upstream and on downstream so it does not interfere with the PNM characterization and operation of the cable modem 102.

It may also be possible to use a cable modem with full band RF spectrum capture capability in a completely stand-alone manner without need to connect a CMTS 105 to it, rather using a console connection or other means to access the modem's spectrum capture capability without need for a CMTS 105. In this case, the stand-alone setup may be as simple as a noise generator in place of the IP device 106 and CMTS with PNM 105, and the fixed, calibrated network interface 104 and calibrated or test network interface 103 to perform the PNM-based craft evaluation.

Another way in which test and measurement equipment 402 may be used is as an external noise source to represent ingress that can get into a poorly crafted connector. The equipment 402 could either be a narrowband tone generator or a broadband noise generator, and the test equipment signal could be output to an antenna that is places near the calibrated or test network interface 304. Poor craft skills would result in this external signal ingressing into the cable network and could be demonstrated via PNM-based technology such as full RF spectrum capture on the downstream or upstream spectrum capture such as will be possible with DOCSIS 3.1 PNM technology.

FIG. 5 shows the architecture of a system that allows a plethora M of training facilities 501, 501 and 503 to be tied in to a centralized network operations center (NOC) facility 504 and a centralized remote evaluation function 505. All of the PNM data from each training facility, and in fact the entire network can be collected in the NOC and provided to the centralized remote evaluation element 506 which may be collocated with the NOC, geographically distinct from it, or a combination of sub-elements in 506 be located in the NOC and others geographically distinct from the NOC. In this scenario, results from different training facilities can be compared and contrasted so that the techniques and processes used at training facilities that consistently perform at the highest craft levels can be used to improve the other training facilities.

FIG. 6 shows the details of sub-elements within the remote evaluation element 506. In one aspect, a cloud-based evaluation function 601 is included which allows the results of a plethora of PNM-based craft evaluations to be sorted, classified, cataloged, and prioritized by existing cloud solutions used by the owners of such a PNM-based craft evaluation system, or the cloud-based evaluation 601 could be replaced with a crowd-based solution whereby any subject matter experts (SMEs) who have access to the packet switched network 304 and are authorized by the owners of PNM-based craft evaluation systems to contribute to the operation of the system can manually perform the functions of evaluating, sorting, classifying, cataloging, and prioritization of the data and subsequent evaluations in a PNM-based craft evaluation system.

Alternately, if it is desired to fully automate the evaluation of PNM-based craft evaluation, the remote evaluation processor 602 can be used, which includes a pattern database 603, a pattern recognition system 604, and an automated evaluator engine 605 that uses results of the PNM-based craft evaluation from the plethora of facilities 501, 502 and 503 provided by the NOC 504 with machine algorithms apparent to those skilled in the art to produce the final evaluation of an individual student's craft to the training facility in which the student is located. Importantly, this also applies to other types of remote sites such as homes, community colleges, and hardware stores.

FIG. 7 shows the architecture of a stand-alone system that applies the principles of the present invention with PNM-based evaluation of craft skills in non-RF network such as fiber optic networks. Examples include, but are not limited to use of a radio frequency over glass (RFoG) system within the overall setup whereby a fiber to the premises (FTTP) system 701 based on for example the RFoG standard and architecture is used. The FTTP system 701 converts both upstream and downstream RF signals into optical signals that are then passed through a calibrated optical-to-optical termination network 702 with the result that an optical calibrated or test network interface 703 (such as testing a student's ability to do field fusion splicing of FTTP deployment) are alternately connected to an optical networking unit (ONU) 704 and thence to a cable modem 102 and IP device 107. In this manner, the calibrated and test network interfaces 703 can be compared via PNM-based craft evaluation using the method of the present invention, even though the craft being tested is actually optical connectors for example, not the RF connectors as previously described.

Other physical media dependent (PMD) systems such as wireless or powerline media may also be tested in the same manner, substituting the other PMD system for the FTTP and associated optical components just described.

In one exemplary embodiment, there may be a measurement device, such as a cable modem (CM), a cable modem termination system (CMTS), or another device appropriate for the communications technology, that performs a measurement. The measurement device takes measurements of a signal using proactive network maintenance (PNM) parameters and sends them for further assessment. The PNM parameters may include, but are not limited to, spectrum analysis, equalizing coefficients, pre-equalizing coefficients, signal-to-noise, symbol capture, linear impairments, power levels, uncorrectable errors, low RxMER in one or more subcarriers, spectrum that deviates from ideal, pre-equalizer coefficients that have high energy off of the main tap, channel estimation coefficients that vary widely by frequency, a modulation profile indicating subcarriers that are not transmitting at their expectation or potential, or the like. In some cases, the communication technology may be Passive Optical Network (PON), with OLTs and ONUs as endpoints. In some cases, the access network technology may be Wi-Fi, with access points and network adapters are endpoints.

The measurement device may measure a variety of characteristics of an upstream or a downstream signal. In some cases, the signal may be generated for the specific purpose of testing, such as by a noise generator. In some cases, the signal may be the result of the normal operation of a service provided to an end device. In one example, the signal may be a radio frequency signal. In another example, the signal may be an optical signal. The measurement device may comprise a memory, a processor, and a communications interface. The memory may store instructions that may be executed by the processor in conjunction with the communications device. The communications interface may assist in measuring the PNM parameters, as well as sending results of the PNM measurements, and receiving commands/requests from other entities in the network.

In one scenario, after a technician replaces a component of a physical network, that component needs to be tested to ensure that it has been correctly installed (e.g., the performance of the component meets the minimum requirements for normal use). The measurement device may be used to test the installation of the component (e.g., the performance of the component). The component may be any part of a physical network, such as one or more connectors, cables, patches, devices, and other physical entities that may be attached to the wireline infrastructure of the physical network.

The skill of the technician who performed the installation of the component may be directly correlated to the results the performance of the component as a result of the installation, or said another way, the skill of the technician may be directly correlated to one or more the PNM measurements of the installed component. In some cases, the installation of a component may be for a new configuration of a physical network. In some cases, the installation of the component may be a replacement of an existing component in need of repair in an already configured physical network. Generally, PNM measurements enable the identification of potential issues related to the component, such as radiofrequency notches, microreflections, roll-off, LTE and radio ingress, adjacency, filters, and resonant parking. One or more of these issues may be a result of the installation, and by association, correlated to the skill of the technician. Accordingly, if one or more issues are identified, the identified issues may relate to the technician's skill.

Once the PNM measurements are taken, a file may be generated with the PNM measurements and other information and sent by the measurement device. The file may be associated with a recently installed component for a given time or time period, and may include other information as well (e.g., location, measurement device identifier such as MAC address, etc.). The file may be sent to a remote server that runs an assessment program. The server may part of a network operations center (NOC). The server may comprise a memory, a processor, and a communications interface. The instructions for the assessment program may be stored in the memory and executed by the processor in conjunction with the communications interface. The file, amongst other files, may be stored in the memory. In an alternative situation, the assessment program may run on the measurement device.

The assessment program may determine an assessment report for the technician that represents the technician's skill at installing the component associated with that file (i.e., PNM measurements). The determination of the assessment report may be based on a number of factors, such as the information contained in the received file, an assessment of that information, and other information. In some cases, the assessment report may be based on a comparison of the PNM measurements from the file against baseline PNM information (e.g., ideal PNM parameters or minimum required parameters). In some cases, the baseline information may be gathered from averaging a statistically significant number of PNM measurements of successful installations. Alternatively, or in addition to, the baseline information may be based on a minimum required value for each of the PNM measurements taken. In some cases, the assessment report may be based on identified issues as previously disclosed above. Specific issues may correlate with specific assessment factors of the assessment report. In some cases, the assessment report may be based on additional input, such as additional sensors or measurements that have been sent to the server from the component/installation location.

The assessment report may comprise of one or more values, descriptions, and/or expert analysis. The assessment report may include a grade, where a threshold grade indicates a passing or failing assessment for a given technician that performed the installation. In some cases, one or more grades are aggregated and averaged to determine a cumulative assessment for a class being taken by the technician. Multiple assessment reports may be analyzed to determine trends for a single technician, tracking the technician's progress from initial craft capabilities to final testing and certification of their craft capabilities.

The assessment report may be sent to a display that is proximate to the relevant technician, and/or to an instructor of the relevant technician. In some cases, the assessment report may provide specific feedback to the technician to correct the installation of the component.

In one scenario, the technician may be part of a group of technicians that are part of a class for training technicians to become certified in craft skills for a telecommunications workforce. A classroom may be configured with multiple assessment devices, each associated with a technician of the class such that multiple installations of components may occur and be assessed simultaneously during the class. The server may receive files (e.g., PNM measurements) in real-time as the class is conducted for each of the technicians that have completed installing a component. The server may be configured to send assessment reports of each of the technicians in real-time to a display being used, or in proximity to, the respective technicians or teacher of the class.

The server may correlate and catalogue the assessment reports for analysis (e.g., pattern recognition, averages, comparisons, trends, historical assessments, etc.). The server may perform this analysis of the assessment reports once a statistically significant number of assessment reports are collected and analyzed. The analysis and pattern recognition may correlate other information related to each assessment report as well, such as the nature of the installation, the location, the time, and other related factors. The server may perform this analysis on the assessment reports for an entire class, from start to finish, periodically, or as a total for all technicians and each installation performed in the class. This analysis may be used to alter the class format, requirements, and baselines used to determine assessment reports. The analysis may determine the average, below average, and above average craft capabilities that are possible at different stages of an average technician's training. For example, a higher assessment report may be expected from a technician in a later time period of a class as compared to the assessment report expected from that technician at the beginning of the class. This analysis may also help the server to dynamically determine a baseline used for determining the assessment report for any given point in time for the class. The analysis may be sent to a display for further review. The analysis may prompt an automated change in the instruction of one or more technicians.

While various embodiments of the present invention have been described above, it should be understood that they have been presented by way of example only, and not limitation.

What is claimed is:

1. A system for providing proactive network maintenance (PNM) based, substantially real-time feedback relating to a technician affected network component, comprising:
a network connected device in communication with a network, wherein the network connected device comprises:
a first processor operatively coupled to memory, and a first communications interface operatively coupled to the first processor, the first communications interface configured to receive one or more signals associated with the technician affected network component
the first processor configured to generate proactive network maintenance (PNM) data associated with the technician affected network component based on one or more signals, and
the first communications interface configured to send the PNM data; and
a server running an evaluator engine in communication with the network connected device, wherein the server comprises:
a second processor operatively coupled to a second memory, and a second communications interface operatively coupled to the second processor, the second communications interface configured to receive the PNM data associated with the technician affected network component from the network connected device,
the second processor configured to determine an assessment associated with the technician affected network component and an installation technician based on the PNM data, and
the second communications interface configured to transmit the assessment to provide real-time feedback concerning the installation of the technician affected network component.

2. The system of claim 1, wherein the PNM measurements include: power levels; uncorrectable errors; low RxMER in one or more subcarriers; spectrum that deviates from ideal; pre-equalizer coefficients that have high energy off of the main tap; channel estimation coefficients that vary widely by frequency; and a modulation profile indicating subcarriers that are not transmitting at their expectation or potential.

3. The system of claim 1, wherein the signal is a radio frequency transmission.

4. The system of claim 1, wherein the signal is an optical transmission.

5. The system of claim 1, wherein the server is at a remote location relative to the network connected device, and wherein the network connected device is a cable modem.

6. The system of claim 1, wherein the technician affected network component is a cable or a connector between one or more cables of the network.

7. The system of claim 1, wherein the signal is generated for training the installation technician.

8. The system of claim 1, wherein the signal is generated for normal operation of the network.

9. The system of claim 1, wherein the network is a training network not connected to a local cable operator.

10. The system of claim 1, wherein the network is a local cable operator's network.

11. The system of claim 1, wherein the second communications interface is further configured to send an assessment report to a display of a teacher of the installation technician in a second facility different than a first facility of the measurement device.

12. The system of claim 1, further comprising a noise generator, the noise generator configured to generate a noise signal to simulate external noise ingressing into the network at the technician affected network component, wherein the PNM measurements are based in part on how much of the noise signal is captured.

13. The system of claim 1, wherein an assessment report is based in part in comparing calibration PNM measurements taken prior to the installation of the technician affected network component.

14. The system of claim 1, wherein an assessment report includes key performance indicators and a grade of skills of the installation technician, wherein the PNM measurements of the technician affected network component correlate with the key performance indicators and the grade.

15. The system of claim 1, wherein the PNM measurements are sent in a file, and the file includes a location where the PNM measurements are taken, and wherein an assessment report is further based on additional information known about the location.

* * * * *